United States Patent
Rae et al.

(10) Patent No.: US 8,861,074 B2
(45) Date of Patent: Oct. 14, 2014

(54) OPTICAL PARAMETRIC GENERATOR BASED ON A SLANT-STRIPE PERIODICALLY POLED NONLINEAR MATERIAL WITH OPTIMIZED LATERAL OUTPUT COUPLING OF A TERAHERTZ SIGNAL

(75) Inventors: Cameron Francis Rae, Fife (GB);
Malcolm Harry Dunn, Fife (GB);
David Alan Walsh, Fife (GB)

(73) Assignee: University Court of the University of St Andrews, St Andrews (GB)

( * ) Notice: Subject to any disclaimer, the term of this patent is extended or adjusted under 35 U.S.C. 154(b) by 0 days.

(21) Appl. No.: 13/634,437

(22) PCT Filed: May 10, 2011

(86) PCT No.: PCT/GB2011/000710
§ 371 (c)(1),
(2), (4) Date: Dec. 12, 2012

(87) PCT Pub. No.: WO2011/141693
PCT Pub. Date: Nov. 17, 2011

(65) Prior Publication Data
US 2013/0128340 A1    May 23, 2013

(30) Foreign Application Priority Data
May 14, 2010  (GB) .................................. 1008073.7

(51) Int. Cl.
*G02F 1/39*  (2006.01)
*G02F 1/35*  (2006.01)
*G02F 1/355*  (2006.01)

(52) U.S. Cl.
CPC .............. *G02F 1/39* (2013.01); *G02F 2201/17* (2013.01); *G02F 2201/30* (2013.01); *G02F 1/3544* (2013.01); *G02F 1/3558* (2013.01)
USPC ......................................................... 359/330

(58) Field of Classification Search
USPC ............................... 359/326–332; 372/21–22
See application file for complete search history.

(56) References Cited

U.S. PATENT DOCUMENTS 5,841,570 A  * 11/1998  Velsko ........................... 359/330
6,697,186 B2 *  2/2004  Kawase et al. ................ 359/330
(Continued)

FOREIGN PATENT DOCUMENTS

WO    WO 2006/010916 A2    2/2006

OTHER PUBLICATIONS

Molter et al.: "A pump enhanced ns—OPO for THz generation"; IEEE, Sep. 15, 2008, pp. 1-2.
(Continued)

*Primary Examiner* — Daniel Petkovsek
(74) *Attorney, Agent, or Firm* — W. Kevin Ransom; Moore & Van Allen PLLC

(57) ABSTRACT

An optical parametric device comprising a slant-stripe periodically poled nonlinear material that is operable to generate signal in response to interaction with a pump wave, the non-linear interaction being such that the pump and idler waves are collinear and the signal wave is non-collinear relative to the pump and idler waves, wherein the slant-stripe non-linear material is able to generate two idler waves and two signal waves, and the device is adapted to allow for the selection and output coupling of a required one of the two signal waves.

13 Claims, 7 Drawing Sheets

(56) References Cited

U.S. PATENT DOCUMENTS

| 7,706,054 | B2* | 4/2010 | Rae et al. | 359/330 |
|---|---|---|---|---|
| 7,768,695 | B2* | 8/2010 | Dunn et al. | 359/330 |
| 8,699,124 | B2* | 4/2014 | Dunn et al. | 359/330 |
| 2002/0176472 | A1 | 11/2002 | Arbore et al. | |

OTHER PUBLICATIONS

Kawase et al.: "Unidirectional radiation of widely tunable THz wave using a prism coupler under noncollinear phase matching condition"; Appl. Phys. Lett. 71 (6), Aug. 11, 1997, pp. 753-755.

Walsh et al.: "Intracavity parametric generation of nanosecond terahertz radiation using quasi-phase-matching"; Optics Express, vol. 18, No. 13, Jun. 21, 2010, pp. 13951-13963.

Molter et al.: "THz-OPO with a novel QPM-scheme"; IEEE, Sep. 21, 2009, pp. 1-2.

Molter et al.: "Nanosecond terahertz optical parametric oscillator with a novel quasi phase matching scheme in lithium niobate"; Optics Express, vol. 17, No. 8, Apr. 13, 2009, pp. 6623-6628.

Sasaki et al.: "Terahertz-wave surface-emitted difference frequency generation in slant-stripe-type periodically poloed $LiNbO_3$ crystal"; Applied Physics Letters, vol. 81, No. 18, Oct. 28, 2002, pp. 3323-3325.

Kawase et al.: "Terahertz wave parametric source"; Journal of Physics D: Applied Physics; vol. 35 (2002), pp. R1-R14.

Yarborough et al.: "Efficient, Tunable Optical Emission From $LiNbO_3$ Without a Resonator"; Applied Physics Letter, vol. 15, No. 3, Aug. 1, 1969, pp. 102-105.

Kawase et al.: "Arrayed silicon prism coupler for a terahertz-wave parametric oscillator"; Applied Optics, vol. 40, No. 9, Mar. 20, 2001, pp. 1423-1426.

Kawase et al.: "Coherent tunable THz-wave generation from $LiNbO_3$ with monolithic grating coupler"; Appl. Phys. Lett. 68 (18), Apr. 29, 1996, pp. 2483-2485.

International Search Report for PCT/GB2011/000710, dated Aug. 4, 2011.

\* cited by examiner (a)

(b)

(a)

(b)

OPTICAL PARAMETRIC GENERATOR BASED ON A SLANT-STRIPE PERIODICALLY POLED NONLINEAR MATERIAL WITH OPTIMIZED LATERAL OUTPUT COUPLING OF A TERAHERTZ SIGNAL

CROSS-REFERENCE TO RELATED APPLICATIONS

This application is filed under the provisions of 35 U.S.C. §371 and claims the benefit of International Patent Application No. PCT/GB2011/000710, filed on May 10, 2011, which claims the benefit of Patent Application No. 1008073.7, filed in Great Britain on May 14, 2010; all of which are hereby incorporated by reference in their entirety.

FIELD OF THE INVENTION

This invention relates to the generation of electro-magnetic radiation through a parametric-wave generation process, and in particular radiation that is outside the normally accepted transparency range of the non-linear optical material used.

BACKGROUND OF THE INVENTION

Parametric devices are flexible and convenient sources of widely-tunable coherent radiation, encompassing all timescales from the femtosecond pulse to the continuous-wave. In these, a coherent beam of electromagnetic radiation is used to stimulate a non-linear process in a non-linear optical crystal, resulting in the division of the power/energy in the coherent pump wave into two generated waves, typically referred to as the signal and idler waves. The signal is usually defined as that wave providing the useful output, and hence throughout this document is identified as the wave having the longer wavelength of the two generated waves.

Parametric devices can operate in a variety of configurations including amplifiers, oscillators and generators. In a parametric amplifier an intense coherent pump wave is made to interact with the nonlinear optical crystal to produce amplification at the signal and idler optical wavelengths. A parametric oscillator uses a parametric amplifier inside an optical cavity resonant at one or both of the signal and idler waves. Here, the signal and idler waves are either self-starting from noise/parametric fluorescence or the cavity is injection seeded by a suitable source operating at the signal and/or idler wavelength. A parametric generator generates optical waves by the interaction of an intense coherent pump wave with a nonlinear optical crystal to parametrically produce two other optical waves. No cavity is provided for the down-converted waves since parametric gain is sufficiently high as to allow adequate transfer of energy/power to these waves with only non resonant single (or multiple) passing of the pump and or idler and or signal waves through the nonlinear medium. Again, in this case the signal and/or idler waves are either self-starting from noise/parametric fluorescence or the generator is injection seeded by a suitable source operating at the signal and/or idler wavelength.

There is considerable interest in extending the spectral coverage of parametric devices. This is because they are often used as sources of coherent radiation in spectral ranges either not covered by any other sources, or where a single parametric-wave source is capable of replacing a number of sources that would otherwise be needed in order to provide the spectral coverage required. However, a serious limitation of known parametric devices is the detrimental effect of absorption of one or more of the three waves involved in the non-linear interaction within the nonlinear medium itself. As a result the spectral coverage attainable through a particular parametric generation scheme is often limited only by the presence of absorption and not by the nonlinear or phase-matching characteristics of the nonlinear medium being employed. Elimination of the restriction imposed by absorption would result in improved spectral coverage.

One solution for overcoming problems due to absorption has been identified. This involves using non-collinear phase-matching in such a way as to cause the wave subject to absorption, usually the signal wave, to rapidly walk-out of the nonlinear medium in a direction that is substantially lateral to the propagation direction of the pump wave. Examples of this technique are described in the articles "Efficient, tunable optical emission from $LiNbO_3$ without a resonator", by Yarborough et al, Applied Physics Letters 15(3), pages 102-104 (1969); "Coherent tunable THz-wave generation from $LiNbO_3$ with monilithic grating coupler", by Kawase et al, Applied Physics Letters 68(18), pages 2483-2485 (1996), and "Terahertz wave parametric source", by Kawase et al, Journal of Physics D: Applied Physics 35(3), pages R1-14 (2002).

FIG. 1 is an illustration of the known non-collinear phase-matching process. More specifically, FIG. 1(a) illustrates the geometry of the interacting pump 1, idler 2 and signal 3 waves in the nonlinear medium 4. FIG. 1(b) illustrates the phase-matching process through a so-called k-vector diagram, where $k_p$, $k_i$ and $k_s$ are the wavevectors of the pump, idler and signal waves respectively, angle $\theta$ is the angle subtended by the pump 1 and idler 2 waves and angle $\rho$ is the angle subtended by the pump 1 and signal 3 waves.

As can be seen from FIG. 1(b), in the known non-collinear phase matching process the pump wave 1 and idler wave 2 are not themselves collinear within the nonlinear medium 4. However, to maintain the necessary nonlinear interaction between them throughout the length of the nonlinear medium 4, they must be of sufficient radial (transverse) extent to maintain an overlap between them throughout the length of the medium 4. This means that it is not possible to employ small (i.e. tightly focussed) beam sizes for these waves. Having small beam sizes is desirable because it increases the intensities of the waves, so as to reduce the power or energy necessary for attaining a level of parametric gain required for the operation of the device.

WO 2006/010916 describes a parametric device that uses a nonlinear crystal that has slant-stripe-type of periodic-poling to generate a signal and an idler wave in response to being stimulated with a pump wave, wherein the non-linear medium is such that the pump and idler waves are collinear and the signal wave is non-collinear. By arranging for the signal wave to be non-collinear with the other waves, this means that the signal wave walks-off from the other waves and exits the nonlinear medium within a short distance and hence with reduced absorption. Because the pump and idler beams are collinear, tight focussing of these beams is now possible. Hence, the parametric gain available for a given pump power/energy is not restricted, as described previously, by the requirement to maintain relatively large beam sizes for the purpose of ensuring beam overlap throughout the length of the nonlinear medium. An advantage of tight focusing of the pump and idler beams is that these beams may be propagated closer to the edge of the nonlinear medium so further reducing the path over which the signal beam must propagate before exiting the medium. This further reduces the absorption losses to which this beam is subjected. Having the pump and idler waves collinear means that common elements can be used such as, but not restricted to, mirrors for the guidance of these waves. This can simplify otherwise complicated arrangements.

FIG. 2 illustrates the non-linear process that occurs in a slant-stripe-type periodically-poled crystal when it is pumped with a single pump wave. In this case, the pump wave is collinear with the idler wave, but the signal wave walks-off in a direction substantially lateral to the pump wave. The operation of this device and in particular the role played by slant-stripe-type periodic-poling may be described in terms of phase-matching diagrams in which the periodic poling is represented by a grating vector $k_A$ of length determined by the period of the poling and direction determined by the slant angle of the poling. Incorporation into a vector phase-matching diagram of such a grating vector $k_A$ allows the geometry associated with the wave-vectors of the pump, signal and idler waves to be elucidated.

SUMMARY OF THE INVENTION

The present invention is based on the realisation that the phase-matching diagram of FIG. 2 is only a partial representation of the real physical situation. FIG. 2 shows a single output wave, but the inventors have appreciated that the grating vector is bipolar, and so there are two possible solutions in terms of the combination of pump, signal and idler wave-vectors that fulfil the phase-matching condition, not one as widely accepted in the art. This is illustrated in FIG. 3, which shows quasi phasematching solutions with collinear pump and idler waves for terahertz generation in slant-stripe-type periodically-poled lithium niobate (PPLN). Light grey lines illustrate the inverted, slanted domain walls in the crystal. The wave vectors k of electromagnetic waves are illustrated with subscripts p, i and THz for the pump, idler and signal (terahertz) wavelengths respectively. The grating vector is denoted G. The two solutions are illustrated identified by (1) or (2). With each of these there is associated an angle of emission that the wave vector of the terahertz radiation makes with the common propagation direction of the idler and pump wave. In general this angle is different for the two solutions. This has not been recognised within the current state-of-the-art.

The solution corresponding to the smaller of the two angles [solution (2)] is the solution most likely to reach oscillation threshold first as the pulse energy/mean power of the pump wave is increased. This is because in this case the spatial overlap between the three waves, pump, idler and signal, is greater leading to higher parametric gain. Cross-saturation of the parametric gain experienced by the higher threshold solution due to oscillation being established on the lower threshold solution may then preclude the higher threshold solution from reaching oscillation threshold even though the pulse energy/mean power of the pump wave is increased further, and even to beyond the point at which in the absence of oscillation on the lower threshold solution the gain associated with the higher threshold solution exceeds the loss.

The difficulties caused by the two signal waves have not been recognised in the current state of the art. These difficulties relate to both the generation and extraction of the terahertz radiation from the nonlinear crystal. In order for the terahertz radiation to exit through the side face of the nonlinear crystal through lateral beam coupling, as is required in order to minimise the absorption of the terahertz radiation, the terahertz radiation must be incident on this face at an angle less than the critical angle for total internal reflection at this interface. Otherwise, the radiation is reflected back into the nonlinear medium, as shown in FIG. 4, and cannot be effectively extracted. By way of example only, in the case when the side face of the crystal is an interface between the nonlinear medium Lithium Niobate, for which the refractive index in the THz spectral region is of the order of 5, and free space, then the critical angle is of the order of 11°.

In the present state of the art as taught by Kawase, it is known that the critical angle can be increased by placing silicon prisms on the side face of the crystal so that the interface is then between lithium niobate and silicon, see K. Kawase, J.-i. Shikata, H. Minamide, K. Imai, and H. Ito, "Arrayed silicon prism coupler for a terahertz-wave parametric oscillator," Appl. Opt. 40, 1423-1426 (2001). Since the refractive index of silicon in the THz spectral range is of the order of 3, this means that the critical angle at the interface is beneficially increased to be of the order of 40°. Nonetheless it is important from the aspect of the extraction of the generated THz radiation that the angle of incidence of the THz radiation on the interface does not exceed the critical angle. A practitioner working within the present state of the art would choose a grating geometry such that this requirement was fulfilled. However, what has not been recognised is the occurrence of two phase-matching solutions for any particular slant-strip grating as explained above, and the problems that are encountered in relation to the generation and extraction of the THz radiation arising from the presence of these two solutions, due at least in part to the fact that these two solutions have different critical angles and so different output coupling requirements, and also different oscillation thresholds. As a result the choice made by the practitioner while fulfilling the condition relating to the critical angle may not be the solution exhibiting the lower oscillation threshold, and this lower threshold solution may then be such as to exceed the critical angle and hence not be extractable.

According to the present invention there is provided an optical parametric device comprising a non-linear material that is operable to generate signal and idler waves in response to interaction with a pump wave, the non-linear interaction being such that the pump and idler waves are collinear and the signal wave is non-collinear relative to the pump and idler waves, wherein the non-linear material is capable of generating two idler and two signal waves, and the device is arranged to allow for the selection and output coupling of one of the two signal waves.

The device may be arranged to ensure that the lower threshold (higher gain) signal is such that the radiation thereby generated meets the nonlinear crystal side face at less than a critical angle.

In some circumstances, minimising Fresnel and absorption losses may be regarded as more important than reducing oscillation threshold, therefore requiring a shorter path within the crystal for the propagation of the THz radiation than that associated with the higher gain/lower threshold solution. A shorter path would be provided by the lower gain/higher threshold solution. In this case, steps can be taken to suppress or reduce the higher gain/lower threshold solution, so that the shorter path solution is selected.

One or more elements may be provided to suppress or reduce oscillation on the higher gain/lower threshold solution by increasing the losses associated with this solution compared to the lower gain/higher threshold solution.

The one or more elements for suppressing or reducing oscillation on the higher gain/lower threshold solution may comprise one or more dispersive components displaying frequency-dependent losses. These may be placed within the cavity of the idler-waves.

The one or more dispersive components may selectively increase the threshold of oscillation associated with the higher gain solution, so that it exceeds the threshold of oscillation associated with the lower gain solution, this being through the introduction of additional loss at the frequency or frequencies associated with the idler-wave corresponding to the higher gain solution, but not at the frequency or frequencies associated with the idler-wave corresponding to the lower gain solution. In this way, the lower gain solution will be allowed to oscillate.

One or more elements may be adapted to introduce frequency-dependent feedback into the cavity of the idler-waves to selectively decrease the threshold of oscillation associated with the lower gain solution so that it is below the threshold of oscillation of the higher gain solution, so that the lower gain solution reaches oscillation first as the pump energy/power is increased. The one or more frequency-dependent feedback elements may comprise one or more resonant reflector(s) used as one (or more) of the mirrors of the idler-wave cavity.

The device may have a cavity for resonating the idler wave alone. The idler wave may be generated within this cavity as a result of the parametric gain acting initially upon either parametric noise originating within the nonlinear medium itself or any (weak) input wave from an external source that is employed for the purpose of seeding the idler wave cavity.

The non-linear material may be located within the cavity of the pump laser. This is referred to as an intra-cavity geometry.

The nonlinear material may be located within a cavity capable of resonating the pump wave (provided by an external pump laser). This is generally referred to as a pump enhancement geometry. The cavity capable of resonating the pump wave may also resonate the idler wave.

Because the various optical parametric devices as described above and to which the invention is to be applied reduce or indeed avoid, at least partially, the effects of absorption losses, they allow for the realisation of practical sources that can provide terahertz (0.3-10 THz) frequency radiation and long-wave infrared radiation (10-100 microns wavelength). Both these frequency bands are useful for spectroscopic analysis of materials, for example detection of chemical and biological substances in biomedical and security applications.

THz is also of interest in the structural analysis of materials, for example defect detection and analysis. The exploitation of these frequency bands has however previously been impaired by a lack of practical sources. It will however be realised that the invention may be applied to other wavelength bands than those specifically referred to above.

BRIEF DESCRIPTION OF DRAWINGS

Various aspects of the invention will now be described for the purpose of example only and in conjunction with the accompanying drawings, of which.

DETAILED DESCRIPTION OF DRAWINGS

Figure 5:
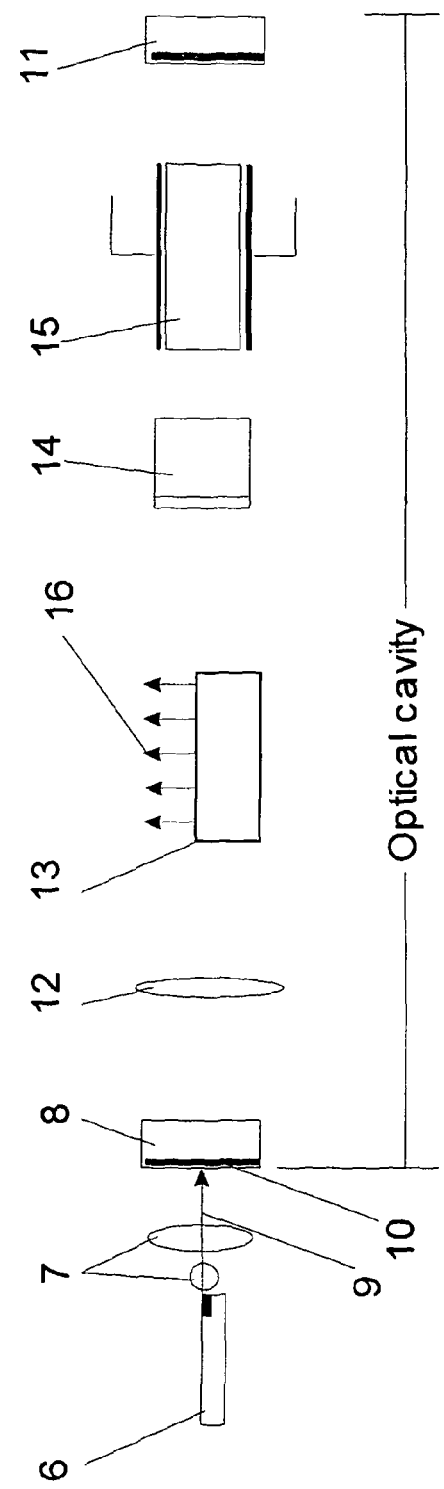
FIG. 5 is a schematic diagram of an intracavity optical parametric oscillator incorporating a non-collinear phase-matching scheme and operating in a pulsed mode.

FIG. 5 shows an intracavity optical parametric oscillator comprising a diode-laser pumped solid-state laser with an active Q-switch to provide pump pulses of short (typically nanosecond) duration and a non-linear medium. In this configuration, the active medium of the pump laser and the non-linear medium are both located within a common cavity, and both the pump wave and preferably the idler wave are resonated by a common set of cavity mirrors, which simultaneously form the pump cavity and the parametric oscillator cavity. Generating the pump wave within this common cavity means that it does not have to be coupled into the parametric oscillator cavity from an external source. Where a slant-stripe-type phase matching process is used, the signal wave is generally of much longer wavelength than the pump and idler waves, and the idler wave is generally of a similar wavelength to the pump wave. The idler and pump waves have similar polarisation states and are arranged so as to propagate collinearly. Within the pump cavity region the pump power is greater than that available outside a similar but optimally output coupled pump source, thus exposing the nonlinear crystal to a higher pump wave intensity than would otherwise be the case outside the pump source resonator.

The oscillator of FIG. 5 has a laser excitation arrangement having a semiconductor diode-laser 6, a lens system 7 and a laser gain medium 8 into which optical radiation 9 from the semiconductor diode-laser 6 is directed. The lens system 7 is provided for optimally matching the spatial profile of the radiation from the semiconductor diode-laser 6 to the mode size, preferably the fundamental $TEM_{00}$ mode, of the radiation in the laser gain medium 8. As a specific example, the laser gain medium is based on the class of laser crystals containing the neodymium active ion, and the semiconductor diode-laser is adapted to deliver optical radiation in the range 795-815 nm, depending on the particular choice of laser crystal, where strong absorption features exist. The semiconductor diode-laser may also be of a pulsed or continuous-wave type. It will be appreciated that other laser crystal types and laser excitation means may also be usefully employed, including for example flash lamp pumping.

On a back surface of the laser gain medium 8, and integral with it, is a reflective coating that defines a first mirror 10. Opposite the laser gain medium 8 is a second reflective surface 11, so forming an optical cavity. Between the laser gain medium 8 and the second reflective surface 11, and along an optical axis thereof, are in sequence a lens 12, a slant-stripe-type nonlinear crystal 13, a polariser 14 and an electro-optic Q-switch crystal 15. The purpose of the lens 12 is to enable the appropriate mode sizes to be obtained in the laser gain medium 8 and the nonlinear crystal 13, when used in association with the first and second mirrors 10 and 11. The purpose of the polariser 14 and electro-optic Q-switch 15 is to controllably modify the Q (or finesse) of the optical cavity in such a way as to generate a pump wave consisting of a sequence of short pulses. The slant-stripe-type nonlinear crystal 13 causes the signal wave to walk off, whilst maintaining the pump and idler waves collinear.

Each of the first and second mirrors 10 and 11 is highly reflective at the wavelength of light emitted from the laser gain medium 8, so causing the laser radiation emitted by the laser gain medium 8 to be, during such time period as allowed by the polariser 14 and Q-switch 15 combination, reflected back and forth. Hence, the first and second mirrors 10 and 11 define a resonant cavity for the pump wave. This results in a pump wave with a circulating power/energy substantially higher than the power/energy of the output achieved for an optimally output coupled laser with similar laser excitation means. Each of the first and second mirrors 10 and 11 is also highly reflective at the wavelength of the idler wave radiation generated in the nonlinear crystal 13 so forming a resonant cavity for this wave also. By having one or both of the pump and idler cavities resonant, the threshold level of pump wave intensity needed for a given set of operating conditions is reduced.

When the arrangement of FIG. 5 is used, stimulation of the nonlinear crystal 13 by the pump wave causes an optical parametric down conversion process to start and so generate a pair of signal and idler waves. Because the crystal 13 is a slant-stripe-type, the generated idler wave is collinear with the pump wave while the generated signal wave 16 walks-off from the other waves. Since the pump and idler waves are collinear, the beam cross section may be made small and hence a high circulating intensity and consequently improved nonlinear gain can be achieved. A further advantage of the small beam cross section is to allow the pump and idler waves to propagate close to the lateral face of the nonlinear crystal 13. Hence, the signal wave 16 may exit the nonlinear crystal 13 after only a short propagation distance and so minimal absorption. Because the pump and idler waves are of similar wavelength, the optical cavity has a similar effect on each of these waves and hence they are inherently mode matched.

In general two possible phase matching solution are associated with any particular slant-stripe grating, with one solution experiencing a higher parametric gain than the other; the higher gain solution being that where the angle between the signal-wave and the collinear pump- and idler-waves is the smaller angle. The solution experiencing the higher parametric gain will reach oscillation threshold first as the pump-wave intensity is increased, always providing the cavity losses associated with the two solutions are similar, and in so doing can thereby preclude the lower gain solution from reaching oscillation threshold at all, for example as a result of cross saturation effects but also including other effects. It is therefore required that in the case of the higher gain solution the generated signal-wave is capable of being coupled out through the side-face of the nonlinear medium, in particular by being incident on this side-face at less than the critical angle. This can be achieved by correct design of the slant-stripe nonlinear medium.

Figure 6:
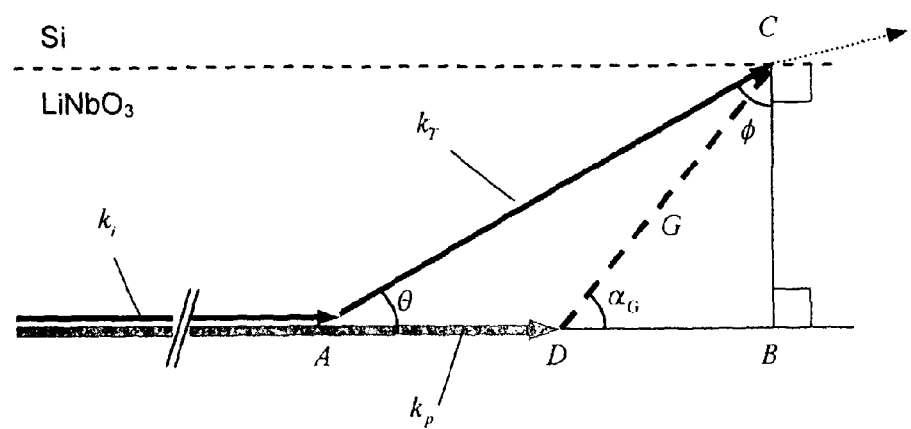
FIG. 6 illustrates the geometry associated with the solution exhibiting the higher parametric gain for the oscillator or FIG. 5.

The geometry associated with the solution exhibiting the higher parametric gain is illustrated in FIG. 6. The interface between the nonlinear medium (in the case illustrated this being $LiNbO_3$) and the silicon prisms (Si) is shown by the horizontal dashed line, and it is required that the angle of incidence, $\phi$, of the wave vector for the signal-(terahertz) wave, $k_T$, on this interface be less than the critical angle. With reference to FIG. 6 the following relationships can be defined:

$$AD = \frac{2\pi n_0 (v_p - v_i)}{c} = \frac{2\pi n_0 v_T}{c} \quad (1)$$

$$AC = \frac{2\pi n_T v_T}{c} \quad (2)$$

$$DB = G\cos\alpha_G \quad (3)$$

$$BC = G\sin\alpha_G \quad (4)$$

$$\theta = \frac{\pi}{2} - \phi \quad (5)$$

Where $v_p$, $v_i$ and $v_T$ are the frequencies of the pump-, idler- and signal-(terahertz) waves respectively; $n_0$ and $n_T$ are the refractive indices of the pump/idler (assumed the same) and the signal (terahertz) wave respectively, G is the grating-vector and $\alpha_G$ the angle of the grating-vector to the optic axis (as shown).

By solving for the geometry of the two right angle triangles in FIG. 6, the following expressions are obtained:

$$\tan\alpha_G = \frac{\sin\theta}{\cos\theta - (n_0/n_T)} \quad (6)$$

$$G = \frac{2\pi n_T v_T \sin\theta}{c\sin\alpha_G} \quad (7)$$

Equation (6) predicts the grating angle required such that the THz radiation generated propagates at the (required) angle, $\theta$, to the optic axis, this angle being determined by the critical angle according to equation (5), while equation (7) predicts the grating period required once the (required) THz frequency is specified. [Note that these equations are valid for the angles as defined in FIG. 6 being in the range 0° to 180°].

As an example consider the system of FIG. 5 where periodically-poled lithium niobate is used as the slant-stripe nonlinear medium, the wavelength of the pump-wave is 1064 nm, a grating is required to phase-match at 2 THz, and where the critical angle is 41°. Therefore if $\theta$ is put equal to 49°, this describes the case where the THz radiation meets the interface just at the critical angle (for an interface with silicon prisms). For the case given $n_0$ and $n_T$ are equal to 2.15 and 5.1 respectively, and the required grating parameters G and $\alpha_G$ are estimated to be $1.7 \times 10^5$ m$^{-1}$ (corresponding to a grating period of 37 μm) and 73° respectively.

From this solution for $\alpha_G$, let us call it $\alpha_G(1)$, the angle of the grating vector can be determined corresponding to the other allowed solution that arises due to the bipolar nature of the grating vector as $\alpha_G(2) = 180° - \alpha_G(1)$. If this second solution is now fed back into equation (6) above then the value of the angle $\theta$ corresponding to this other solution associated with the above chosen bipolar grating-vector can be determined from the quadratic equation (for $\cos\theta$) that results, and in the present case this may readily seen to be 83.5°, clearly indicating that this solution is the one with the higher threshold. [Note that the other solution returned by the quadratic equation is the original value for θ as put in at the start, i.e. 49°]. This latter calculation assumes that the ratio of the refractive indices is the same as in the original case, which in most cases is a reasonable approximation, although of course the frequency of the THz radiation generated will differ from that in the original case. This frequency can be determined from equation (7), on the assumption that the refractive index $n_T$ has the same value as previously, when we obtain 1.5 THz. Clearly if a more reliable estimate is called for, a convergent iterative procedure taking account of the change in refractive index with the frequency of the signal-(terahertz) wave must be entered into in order to yield a more precise final result. Thus, a slant-stripe grating of grating period 37 µm and grating angle 73° is required. For this configuration the solution corresponding to the higher gain/lower threshold will reach oscillation threshold first as the pump energy/power is increased, and the THz radiation thereby generated will be extractable through the side face of the nonlinear medium.

Figure 1:
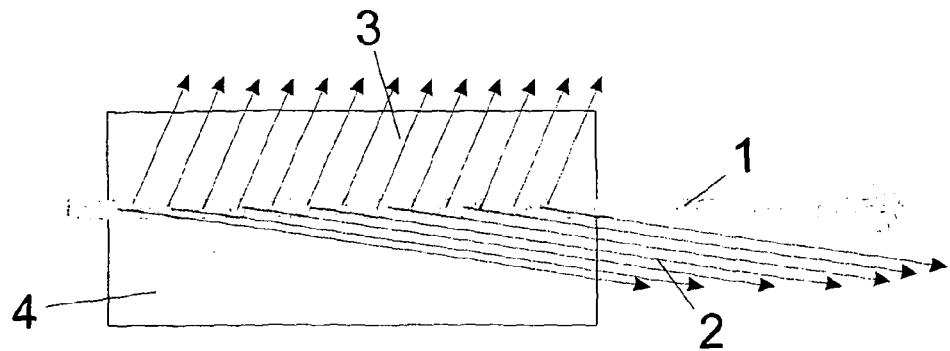
FIG. 1a known non-collinear phase-matching process illustrating the geometry of the interacting pump, idler, and signal waves in a non-linear medium.
FIG. 1b illustrates a known non-collinear phase-matching process illustrating the phase-matching process through a k-vector diagram.
Figure 1:
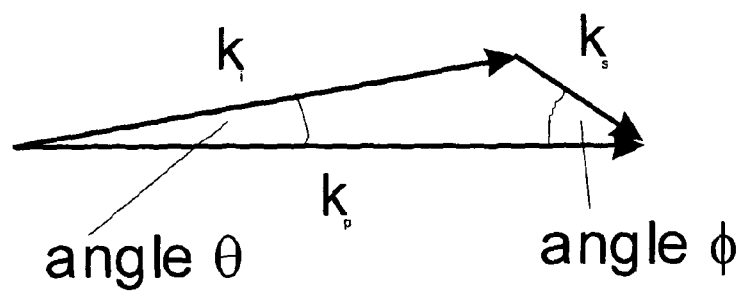
Figure 2:
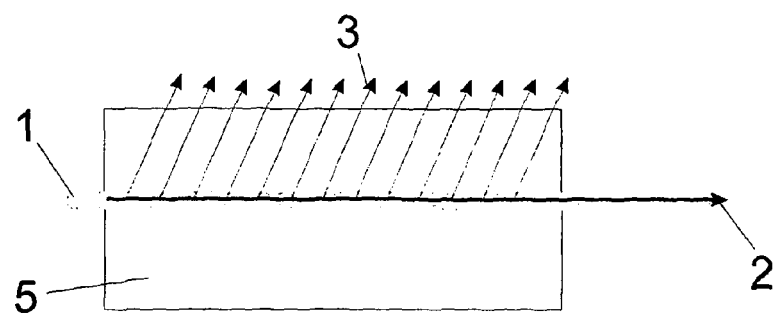
FIG. 2a is a schematic diagram of a non-linear process occuring in a slant-stripe-type periodically-poled crystal.
FIG. 2b is a phase matching diagram of a non-linear process occuring in a slant-stripe-type periodically-poled crystal.
Figure 2:
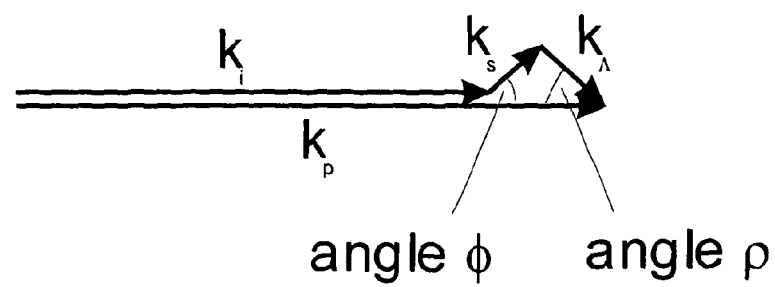
Figure 3:
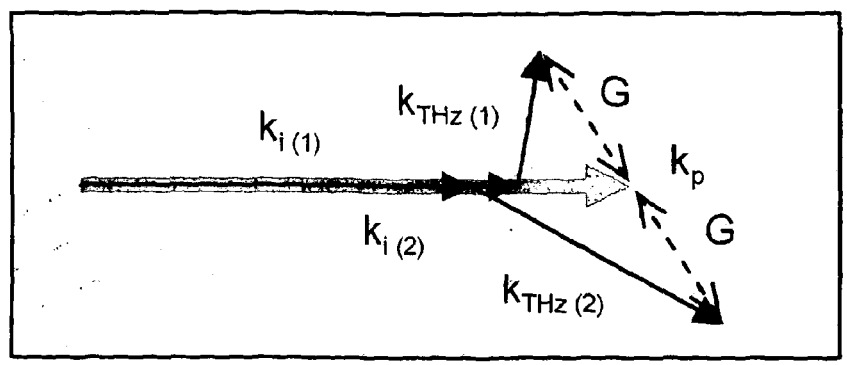
FIG. 3 is a phase matching diagram of quasi phasemetching solutions with collinear pump and idler waves for terahertz generation in a slant-stripe-type periodically-poled lithium niobate.
Figure 4:
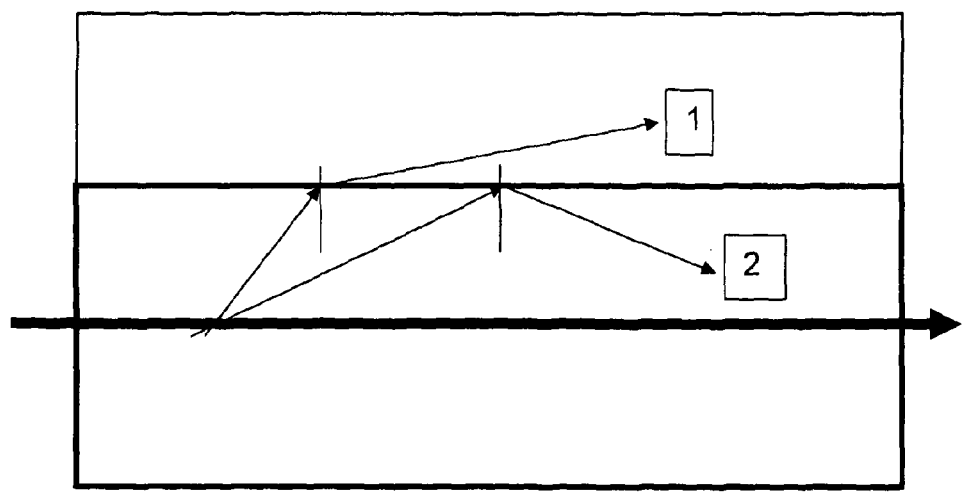
FIG. 4 is a schematic diagram of radiation being reflected back inot the non-linear medium.
Figure 7:
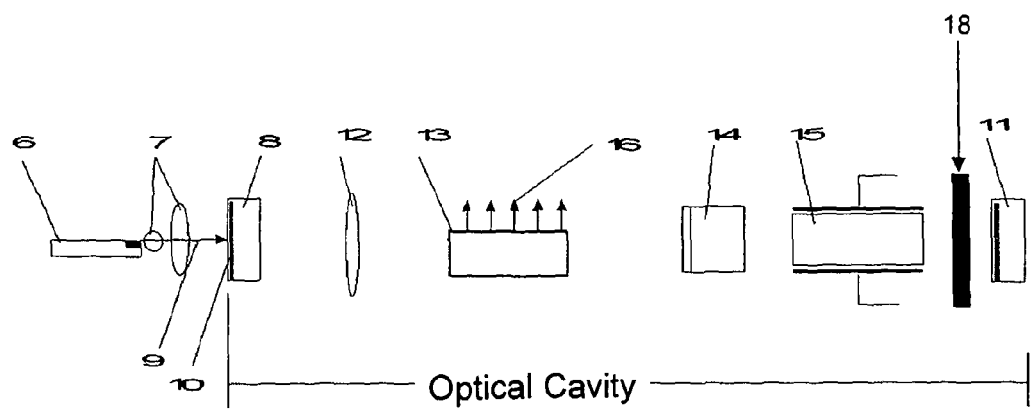
FIG. 7 is a schematic diagram of an intracavity optical parametric oscillator incorporating a non-collinear phase-matching scheme, similar to that of FIG. 5, but including an element for reducing the threshold for oscillation of the lower gain idler wave below that of the threshold of oscillation of the higher gain idler wave.

FIG. 7 shows an intracavity optical parametric oscillator similar to that of FIG. 5, but in which an etalon 18 is in the common cavity of the pump-wave and idler-waves. The purpose of this etalon is to increase the losses associated with the unwanted idler wave, while leaving the losses associated with the pump-wave and the wanted idler-wave unchanged, thereby reducing the threshold for oscillation of the lower gain idler wave below that of the threshold of oscillation of the higher gain idler wave. Such an etalon is therefore required to exhibit pass-bands (i.e. resonances) at the frequencies corresponding to pump-wave and required idler-wave, while showing minimum transmission at the frequency of the un-required idler wave. By examining the geometry of FIG. 3 it can be seen that the lower gain solution as well as exhibiting the larger walk-off angle is also the solution with the lower frequency signal-wave. This indicates that one particular appropriate strategy is to match the free spectral range of the etalon to this lower frequency signal-wave, so that etalon pass-bands may then be simultaneously located at frequencies corresponding to the pump-wave and the idler wave associated with the lower frequency signal-wave, this being attained by appropriate orientation of the etalon. This must be accompanied by appropriate choice of the finesse of this etalon to ensure that at the frequency of the idler-wave associated with the higher frequency signal-wave (this being the signal-wave that it is required to suppress) the etalon transmission has decreased to such an extent that the threshold for oscillation at the higher frequency signal-wave is greater than that at the lower frequency signal-wave.

Figure 8:
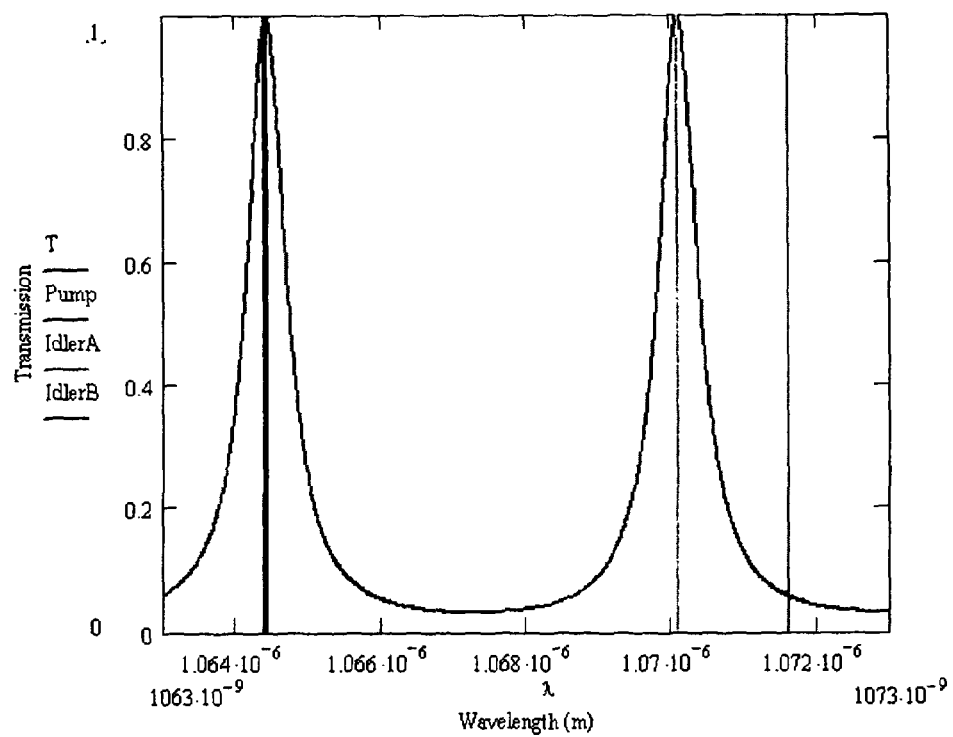
FIG. 8 is plot of transmission amplitude versus wavelength for the pump, and two idler waves of the oscillator of FIG. 7.

Consider the previously discussed case relating to a grating of period 37 µm and angle 73°. It is required to suppress oscillation on the higher gain solution corresponding to a signal-wave frequency of 2 THz and an emission angle relative to the common optical axis of the pump and idler waves of 49°, in favour of oscillation on the lower gain solution corresponding to a signal frequency of 1.5 THz and emission angle of 83.5°. FIG. 8 illustrates how an etalon with a free spectral range of 1.5 THz and a finesse of 9 would be suitable. Such an etalon requires mirror surfaces with a reflectivity of around 70% spaced by an optical thickness of 100 µm. While showing high transmission at the wavelengths of both the pump-wave and the required idler-wave simultaneously, its single-pass transmission at the wavelength of the idler-wave to be suppressed is only 6%. It will be appreciated that such a procedure in selecting the signal-wave with the higher walk-off angle is advantageous in reducing both the Fresnel losses and absorption losses experienced by this signal-wave in exiting the nonlinear medium, and this may in particular circumstances be preferable to the alternative choice of a lower oscillation threshold.

Figure 9:
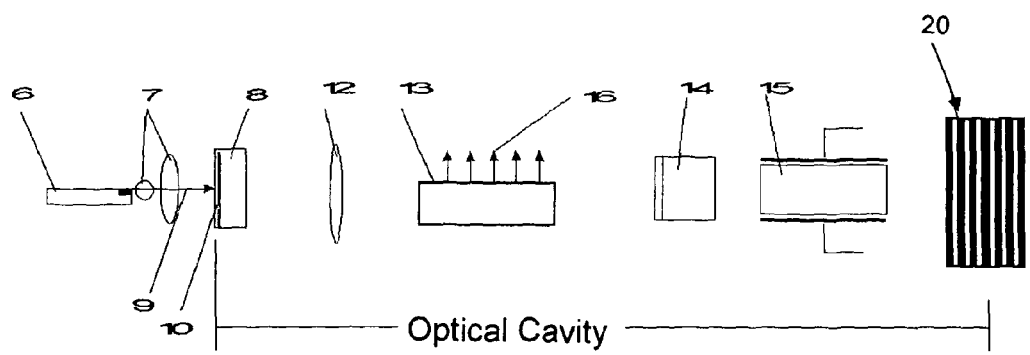
FIG. 9 is a schematic diagram of an intracavity optical parametric oscillator incorporating a non-collinear phase-matching scheme, similar to that of FIG. 5, but including another example of an element for reducing the threshold for oscillation of the lower gain idler wave below that of the threshold of oscillation of the higher gain idler wave.
Figure 10:
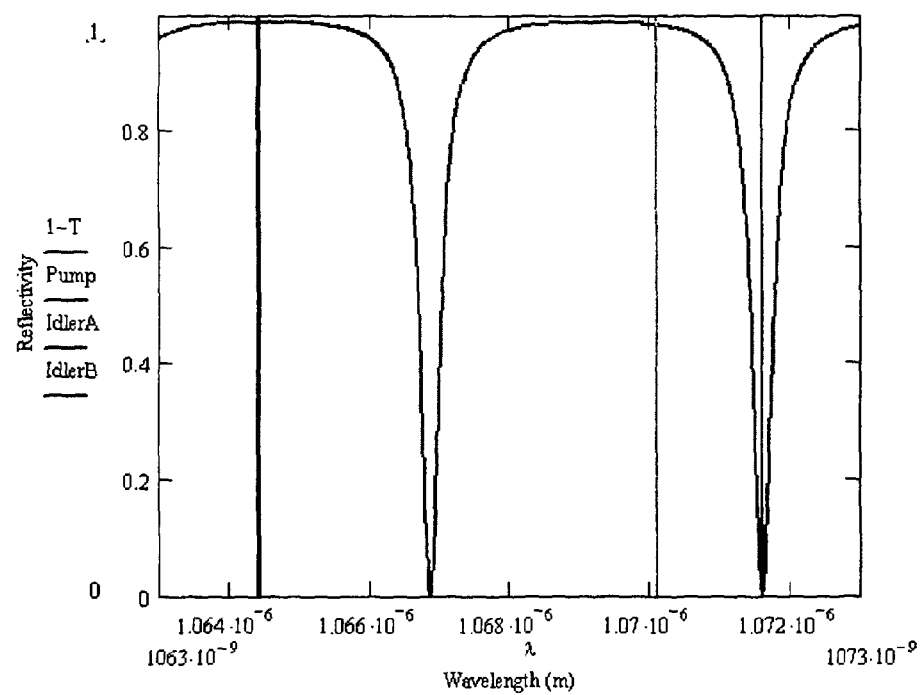
FIG. 10 is plot of reflectivity versus wavelength for the pump, and two idler waves of the oscillator of FIG. 9.

FIG. 9 shows an intracavity optical parametric oscillator similar to that of FIG. 5, but in which a resonant reflector 20 has replaced one of the mirrors of the common cavity of the pump-wave and idler-waves. This resonant reflector is designed such as to increase the optical feedback into the common cavity at the frequency of the lower gain idler-wave through exhibiting an increased reflectivity at this frequency compared to the reflectivity it exhibits at the frequency of the higher gain idler wave, thereby reducing the threshold for oscillation of the lower gain idler wave below that of the threshold of oscillation of the higher gain idler wave. The resonant reflector must also be designed such as to exhibit a high reflectivity at the frequency corresponding to pump-wave, FIG. 10 illustrates how a resonant reflector with a free spectral range of 1.25 THz and a finesse of the order of 14, provided by mirror surfaces of reflectivity 80% spaced by an optical thickness of 120 µm, can fulfil the above requirements for the same conditions as in the previous embodiment. With this arrangement the required high reflectivity (~99%) is provided at the frequencies of the pump-wave and lower gain idler-wave, simultaneously with the required low reflectivity (theoretically zero) at the frequency of the high gain idler-wave. To bring about these conditions the resonant reflector must be tuned, in particular to align the frequency of the low reflectivity dip with the frequency of the high gain idler-wave.

The above description has focussed primarily on an intracavity arrangement. However, a singly-resonant parametric oscillator that has a cavity for resonating the idler wave alone may also be used. The idler wave may be generated within this cavity as a result of the parametric gain acting initially upon either parametric noise originating within the nonlinear medium itself or any (weak) input wave from an external source that is employed for the purpose of seeding the idler wave cavity.

Alternatively, a pump-enhancement cavity geometry may be used, in which the nonlinear medium of the parametric generator/amplifier/oscillator is located within a cavity capable of resonating the pump wave (provided by an external pump laser) as well as preferably simultaneously the idler wave, thereby forming a parametric oscillator. Using a pump-enhanced geometry provides an alternative means for overcoming difficulties that arise due to the collinear propagation of the pump wave and generated idler wave which have substantially the same wavelengths and similar polarisation and spatial configurations. This is because when the pump wave is resonated and hence enhanced within the pump-enhancement cavity the optimum transmission of the input coupling optic for the pump wave is typically around 5%. When in this optimum condition complete transmission of the input pump wave into the cavity results and the device is so called impedance matched. Hence, even where the pump and idler waves are of similar wavelengths and polarisations, current state-of-the-art mirror fabrication allows the required high reflectivity (>95%) to be provided by this mirror for the resonated idler wave, so enabling this mirror to serve as a common optic for the idler and pump waves as required. Another advantage is that the pump power requirement from the pump laser is less than would otherwise be required with no pump-enhancement cavity. The pump-enhancement approach is particularly, but not exclusively, appropriate to the case of continuous-wave devices.

A skilled person will appreciate that variations of the disclosed arrangements are possible without departing from the invention. For example, frequency selective elements other than a resonant mirror may be employed for the above purpose, and that the above embodiment is by way of example only. Also, the parametric device could be a pump-enhanced optical parametric oscillator or could be based on an optical parametric oscillator where only the idler wave is resonant. Furthermore, both pulsed and continuous-wave modes of operation may be used. Accordingly, the above description of a specific embodiment is made by way of example only and not for the purposes of limitations. It will be clear to the skilled person that minor modifications may be made without significant changes to the operation described.

The invention claimed is:

1. An optical parametric device comprising a slant-stripe periodically poled non-linear material that is operable to generate two pairs of signal and idler waves in response to non-linear interaction with a pump wave, the non-linear interaction being such that the pump and idler waves are collinear and the signal wave is non-collinear relative to the pump wave and idler waves in each of the pairs, wherein the device is adapted to:
 select a required signal wave by ensuring the required signal wave and its associated idler wave have a lower oscillation threshold than the other signal and idler wave pair, and
 output couple the required signal wave by ensuring the required signal wave is incident on a side face of the slant-stripe periodically poled nonlinear material at an angle that prevents internal reflection.

2. The optical parametric device as claimed in claim 1 arranged to ensure that the signal wave associated with a phase matching solution corresponding to a lower oscillation threshold meets a nonlinear crystal side face at less than a critical angle.

3. The optical parametric device as claimed in claim 1 comprising one or more optical elements to allow for the selection and the output coupling of a required one of the two signal waves.

4. The optical parametric device as claimed in claim 3 comprising one or more optical elements operable to change the relative magnitudes of intracavity losses associated with the two idler waves so that only generated idler-waves correspond to the required one of the two signal waves.

5. The optical parametric device as claimed in claim 4 wherein the one or more optical elements are operable to suppress or reduce oscillation on the lower oscillation threshold for one of the two idler waves by increasing losses relative to a higher threshold wave.

6. The optical parametric device as claimed in claim 4 wherein the one or more optical elements induce frequency dependent losses.

7. The optical parametric device as claimed in claim 4 wherein the one or more optical elements comprise one or more dispersive elements.

8. The optical parametric device as claimed in claim 4 wherein the one or more optical elements are located in an idler cavity.

9. The optical parametric device as claimed in claim 4 wherein the one or more optical elements are operable to change a relative magnitude of intracavity losses comprise an intracavity etalon.

10. The optical parametric device as claimed in claim 3 comprising one or more optical elements operable to change a relative magnitude of optical feedback associated with the two idler waves such that an only idler-wave generated corresponds to the required one of the two signal waves.

11. The optical parametric device as claimed in claim 10 wherein the one or more optical elements operable to change the relative magnitudes of an optical feedback comprise a resonant reflector.

12. The optical parametric device as claimed in claim 1 that has a cavity for resonating the idler wave in each of the pairs or the pump wave.

13. The optical parametric device as claimed in claim 1 wherein the non-linear material is located within a cavity of the pump laser.

* * * * *